/

US 6,764,126 B2

(12) United States Patent
Mentink et al.

(10) Patent No.: US 6,764,126 B2
(45) Date of Patent: Jul. 20, 2004

(54) HYDRAULIC ACTUATING DEVICE FOR A COVER WITH ASSOCIATED LOCK

(75) Inventors: Laurentius Andreas Gerhardus Mentink, Haaksbergen (NL); Johnny Antonius Jacobus Wiggemans, Oldenzaal (NL)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 10/142,804

(22) Filed: May 9, 2002

(65) Prior Publication Data

US 2002/0167194 A1 Nov. 14, 2002

(30) Foreign Application Priority Data

May 10, 2001 (NL) .............................. 1018035

(51) Int. Cl.[7] .................................................. B60J 7/08
(52) U.S. Cl. ........................... 296/107.01; 296/107.08; 60/429; 60/476
(58) Field of Search ........................ 296/76, 107.01, 296/107.08, 117; 90/44, 361, 15, 41, 42, 392, 508, 521, 533, 536; 60/420, 429, 428, 476

(56) References Cited

U.S. PATENT DOCUMENTS

| 5,253,575 | A | | 10/1993 | Claar et al. | |
|---|---|---|---|---|---|
| 6,149,221 | A | * | 11/2000 | Mentink | 296/117 |
| 6,250,707 | B1 | * | 6/2001 | Dintner et al. | 296/76 |
| 6,422,636 | B2 | * | 7/2002 | Mentink | 296/107.01 |
| 6,508,502 | B2 | * | 1/2003 | Willard | 296/117 |
| 6,508,503 | B2 | * | 1/2003 | Mentink | 296/117 |
| 6,523,344 | B1 | * | 2/2003 | Plassmeyer | 60/464 |
| 2003/0079603 | A1 | * | 5/2003 | Schumacher et al. | 91/361 |

FOREIGN PATENT DOCUMENTS

| DE | 199 12 887 C2 | 10/2000 |
|---|---|---|
| DE | 199 60 012 C1 | 2/2001 |
| DE | 199 44 615 A1 | 4/2001 |
| EP | 0 693 389 A1 | 1/1996 |
| EP | 0 693 390 A1 | 1/1996 |

* cited by examiner

Primary Examiner—Lori L Coletta
(74) Attorney, Agent, or Firm—Quarles & Brady LLP

(57) ABSTRACT

A hydraulic actuating device, for a vehicle cover and an associated lock for locking the cover in the closed position, has a cover actuator and a lock actuator which each are provided with a first and second connection, which are respectively in communication with an associated first and second opening adjoining the actuator space. The cover actuator is provided with a third opening, which is connected to the second connection of the lock actuator. The first connection of the cover actuator and the first connection of the lock actuator are connected to a common connecting line with a single actuable valve, which in a first position connects the delivery port of the pump to the connecting line. The second connection of the cover actuator is in communication with the delivery port of the pump.

5 Claims, 3 Drawing Sheets

HYDRAULIC ACTUATING DEVICE FOR A COVER WITH ASSOCIATED LOCK

FIELD OF THE INVENTION

The present invention relates to a hydraulic actuating device for a cover and an associated lock for locking the cover in the closed position, comprising: a hydraulic cover actuator for moving the cover between an open position and a closed position, a hydraulic lock actuator for moving the lock between a locked position and an unlocked position, the cover actuator and the lock actuator each comprising a housing in which there is an actuator space, which accommodates a piston/piston rod assembly which can slide to and fro and has a piston rod which projects out of the housing on one side, the piston delimiting a base-side chamber and a rod-side chamber in the actuator space, the housing being provided with a first and second connection for supplying and discharging hydraulic fluid, which connections are respectively in communication with an associated first and second opening which adjoin the actuator space and, in each position of the piston/piston rod assembly, are respectively in communication with the base-side chamber and the rod-side chamber, a reservoir for hydraulic fluid, a pump with a delivery port for providing pressurized hydraulic fluid, a single actuable hydraulic valve for controlling both the cover actuator and the lock actuator. In particular, the invention relates to a vehicle of the convertible type provided with a cover and associated lock and also provided with a hydraulic actuating device of this type.

BACKGROUND OF THE INVENTION

A hydraulic actuating device of the abovedescribed type is known, for example, from U.S. Pat. No. 5,253,575. In this known actuating device, the lock actuator is provided with a third opening, which is connected via an associated connecting line to the base-side chamber of the cover actuator. Furthermore, a single electromagnetic two-position valve is provided, for controlling both the lock actuator and the cover actuator.

A drawback of this known actuating device is that the lock must be of a specific type. In particular, the lock must be provided with an associated mechanical blocking device, which holds the lock in its unlocked position as long as the cover is open. When the cover is being closed, just before the closed position is reached, the cover comes into contact with this blocking device, with the result that the locking of the lock is eliminated and the lock can be moved into its locked position by the associated lock actuator. During the closing movement of the cover, the rod-side chamber of the lock actuator is continuously under pressure, but the blocking device prevents the movement of the lock actuator.

It is an object of the present invention to provide an alternative actuating device, which likewise only requires a single actuable hydraulic valve, but allows the use of a lock without a blocking device.

SUMMARY OF THE INVENTION

The present invention achieves this object by providing an actuating device of the abovedescribed type wherein the cover actuator is provided with a third opening which lies between the first opening and the second opening, and in that the third opening of the cover actuator is connected, via a first connecting line, to the second connection of the lock actuator, and the first connection of the cover actuator and the first connection of the lock actuator being connected to a common second connecting line, in which second connecting line the single actuable valve is accommodated, which in a first position connects the second connecting line to the reservoir and in a second position connects the delivery port of the pump to the second connecting line, and the second connection of the cover actuator being in communication with the delivery port of the pump.

Further advantageous embodiments and applications of the actuating device are described in the claims and will be explained in more detail below with reference to the drawing.

DESCRIPTION OF THE PREFERRED EMBODIMENT

Figure 1:
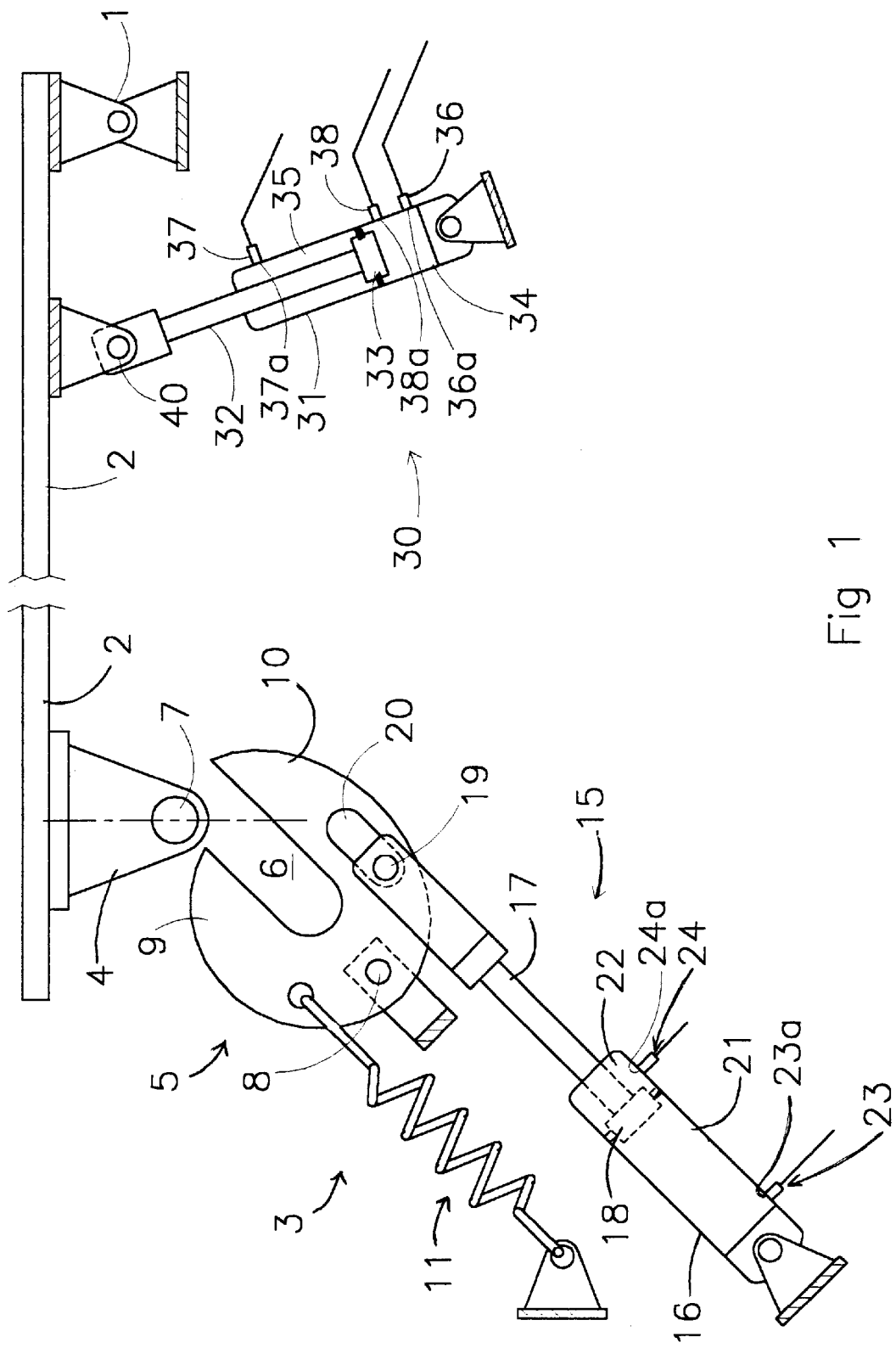
FIG. 1 diagrammatically depicts, not to scale, a cover assembly according to the invention having a cover and a lock, as well as the associated hydraulic actuators.

FIG. 1 diagrammatically depicts a cover assembly, having a cover 2 which can pivot about a pivot pin 1, and an associated lock 3. By way of example, the cover assembly forms part of a vehicle, in particular of the convertible type. In a vehicle of this type, the cover 2 may, for example, form the tonneau cover, the boot lid or the moveable convertible top with foldable covering or with rigid panels. The cover could also be a door or hatchback of the vehicle.

The cover 2 can be moved between an open position and a closed position.

The lock 3 is intended to lock the cover 2 in its closed position.

To move the cover 2, a hydraulic cover actuator 30 is provided, and to actuate the lock 3 a hydraulic lock actuator 15 is provided. The lock actuator 15 is designed to move the lock 3 between a locked position, in which the cover 2 is locked, and an unlocked position, in which the cover 2 is free to move.

The design of the lock 3 illustrated is intended only as an example, and it will be clear to the person skilled in the art that the lock may also be designed in all kinds of other ways.

The lock 3 comprises a first lock element 4, which is secured to the cover 2 and is able to interact with a second lock element 5 in order to keep the cover 2 closed. The second lock element 5 is designed as a plate-like hook with a slot 6 for receiving the pin 7 of the first lock element 4.

The second lock element 5 can rotate about a pin 8. A top limb 9 of the lock element 5 can engage behind the pin 7 when this pin 7 moves into the slot 6. The bottom limb 10 projects beyond the top limb 9 in the unlocked position of the lock 3 as shown in FIG. 1.

A spring 11 acts on the second lock element 5 and holds the second lock element 5 in its unlocked position.

The lock actuator 15 is provided for the purpose of rotating the second lock element 5.

The lock actuator 15 has a housing 16 in which there is an actuator space, in which a piston/piston rod assembly, which can move to and fro, is accommodated, comprising a piston rod 17 and a piston 18. On one side, the piston rod 17 projects out of the housing. At its free end, the piston rod 17 is provided with a pin 19 which fits into a slot 20 in the lock element 5.

The housing 16 is pivotably connected, at the bottom side, to a frame, for example, the body of the vehicle. The end of the spring 11 and the pin 8 are also arranged on a fixed frame.

The piston 18 delimits a base-side chamber 21 and a rod-side chamber 22.

The housing 16 is provided with a first connection 23 and a second connection 24 for supplying and discharging hydraulic fluid. The connections 23, 24 are respectively in communication with an associated first and second opening 23a, 24a, which openings adjoin the actuator space.

In each position of the piston/piston rod assembly, the first opening 23a and the second opening 24a are respectively in communication with the base-side chamber 21 and the rod-side chamber 22.

The cover actuator 30 has a housing 31, in which there is an actuator space in which a piston/piston rod assembly, which can move to and fro, is accommodated, having a piston rod 32 and a piston 33. On one side, the piston rod 32 projects out of the housing and is connected at its end, via a hinge coupling 40, to the cover 2. At the other end, the housing 31 is pivotably connected to a frame, for example, the body of the vehicle.

The piston 33 delimits a base-side chamber 34 and a rod-side chamber 35.

The housing 31 of the actuator 30 is provided with a first connection 36 and a second connection 37, and also with a third connection 38 for supplying and discharging hydraulic fluid. The connections 36, 37, 38 are respectively in communication with an associated first, second and third opening 36a, 37a, 38a, which openings adjoin the actuator space.

In each position of the piston/piston rod assembly, the first opening 36a and the second opening 37a are respectively in communication with the base-side chamber 34 and the rod-side chamber 35.

The third opening 38a lies between the first opening 36a and the second opening 37a and at a distance from each of these two openings. The third opening 38a preferably lies closer to the first opening 36a than to the second opening 37a.

The piston 33 moves past the third opening 38a, so that this opening 38a is in communication with the base-side chamber or the rod-side chamber, depending on the position of the piston 33.

An exemplary embodiment of the cover assembly according to FIG. 1, together with the associated hydraulic actuating device, will now be described with reference to FIG. 2.

Figure 2:
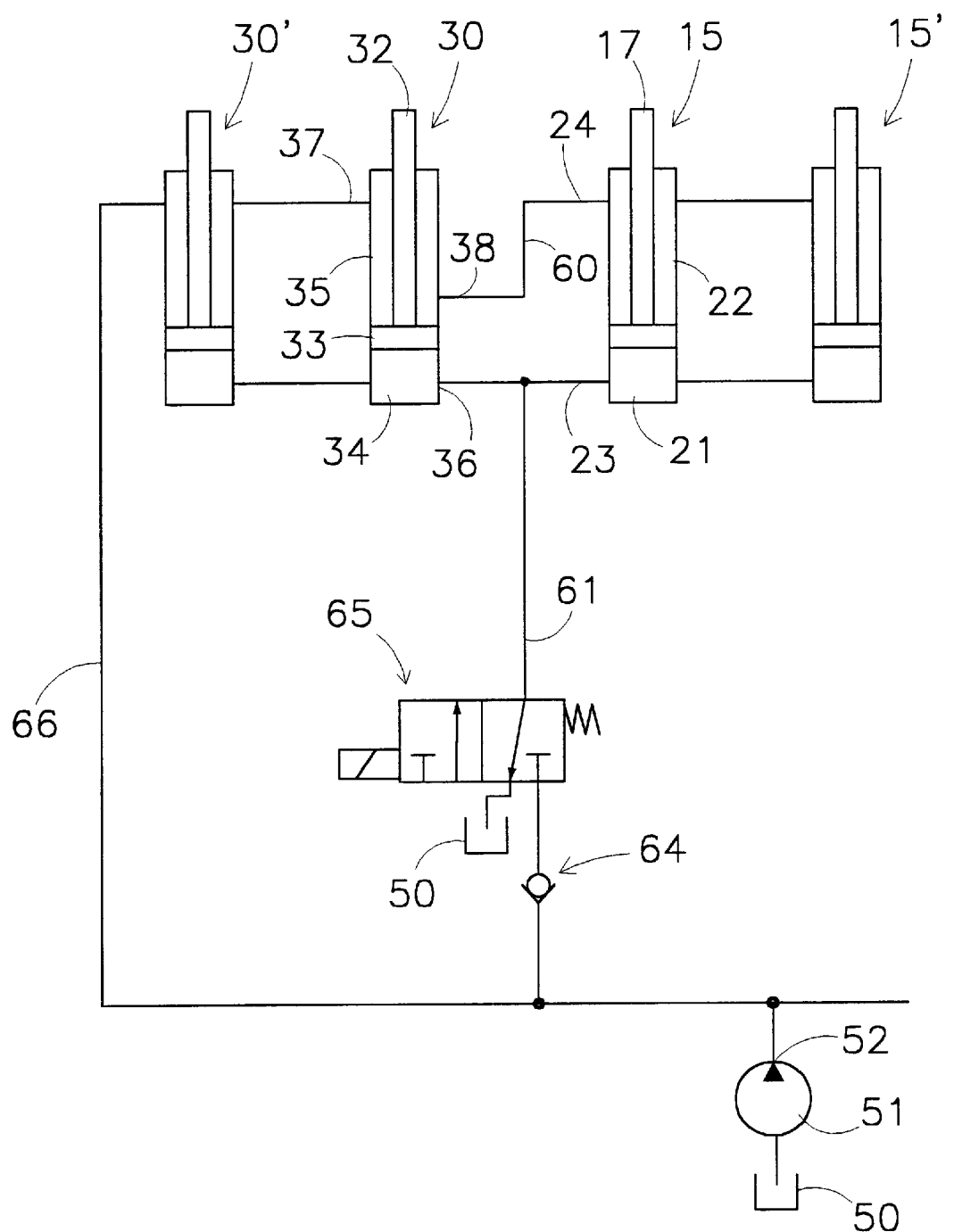
FIG. 2 shows the hydraulic circuit diagram of an exemplary embodiment of the hydraulic actuating device for the cover assembly according to the invention shown in FIG. 1.

FIG. 2 shows the cover actuator 30 and the lock actuator 15, as well as the cover actuator 30' and lock actuator 15' connected in parallel therewith. These parallel-connected actuators 15' and 30' are provided in this example since the cover is moved by means of two actuators which are arranged next to one another. In this example, there are two locks 3, each with an associated lock actuator 15, 15', for locking the cover 2.

FIG. 2 also shows a reservoir 50 for hydraulic fluid and a pump 51 with a delivery port 52 for supplying pressurized hydraulic fluid. By way of example, the pump 51 is an electrically driven plunger pump.

It can be seen from FIG. 2 that the third connection 38 of the cover actuator 30 is connected, via a first connecting line 60, to the second connection 24 of the lock actuator 15. Furthermore, the first connection 36 of the cover actuator 30 and the first connection 23 of the lock actuator 15 are connected to a common second connecting line 61.

The second connecting line 61 incorporates a single actuable valve 65, in this example an electromagnetically actuated two-position, spring-return valve.

In the first position, which is not electrically energized, the valve 65 connects the second connecting line 61 to the reservoir 50.

In the second, energized position of the valve 65, the delivery port 52 of the pump 51 is connected to the second connecting line 61.

In the preferred embodiment shown, a nonreturn valve 64, which closes in the direction of the pump, is incorporated in the second connecting line 61, between the delivery port 52 of the pump 51 and the valve 65. The nonreturn function of valve 64 is preferably integrated in the valve 65.

The second connection 37 of the cover actuator 30 is permanently in communication, via the connection line 66, with the delivery port 52 of the pump 51.

In the position of the piston rods 17, 32 which is shown in FIG. 2, the cover 2 is closed and the locks 3 are locked.

The cover 2 is then opened in the following way.

The pump 51 is started up and the valve 65 is energized. As a result, all the actuators 15, 15', 30, 30' are operated regeneratively, so that the piston rods extend. In the process, the fluid leaves the rod-side chambers 22 of the lock actuators 15, 15' via the first collecting line 60. The lock actuators 15, 15' reach their fully extended position, and the locks 3 therefore reach their unlocked position, within a small part of the extending movement of the cover actuators 30, 30'. The cover actuators 30, 30' continue there extending movement until they have also reached their fully extended position. During this movement, the piston rods of the lock actuators 15, 15' remain fixed in their fully extended position by the regenerative actuating of the said actuators.

The cover 2 is closed in the following way.

As a result of the valve 65 no longer being energized, the piston rods 32 of the cover actuators 30, 30' start to retract, since the connection 36 is now connected to the reservoir 50 and pressurized liquid is being supplied, via the line 66, to the rod-side chambers 35.

During the first part of the retracting movement of the piston rods 32, the lock actuators 15, 15' are free from pressure and will remain in their extended position. In practice, a pressure build-up will be caused by the fluid flowing out of the base-side chambers 34, which help the lock actuators 15, 15' to stay in their extended position in a regenerative manner.

When the piston 33, in particular the sealing ring which surrounds it, moves past the third opening 38a of the cover actuator 30 during the retraction of the piston rod 32, the first connecting lines 60 comes into communication with the rod-side chamber 35. As a result, pressurized fluid passes into the rod-side chamber 22, and the piston rods 17 of the lock actuators 15, 15' slide inwards.

The position of the third opening 38a is selected in such a way that the retracting movement of the piston rods 17 begins only when the pin 7 of the first lock element 4 is situated within range of the second lock element 5. This prevents the lock actuators 15, 15' from moving the locks 3 into the locked position too early or when it is not intended for such a movement to take place.

It is preferable for the pin 7 to already be in the slot 6 before the actuators 15, 15' are activated. In this example, this is made possible by the fact that the second lock element 5 is connected to the piston rod 17 via the pin-slot coupling 19, 20.

When the cover 2 is closing, the pin 7 comes into contact with the bottom limb 10, with the result that the second lock element 5 rotates about the pin 8 over a limited angle, counter to the force of the spring 11, and the pin 7 moves into the beginning of the slot 6. Then, the piston rod 17 starts to retract, so that the lock element 5 rotates further and locking is completed.

To summarize, the first and second lock elements 4, 5 are brought into a type of "pre-engagement" even before the lock actuators 15, 15' are activated as a result of their rod-side chambers being connected to the rod-side chamber of the cover actuator 15. This avoids any risk of the locking not being achieved.

The locks 3 which are shown by way of example also have the effect that, when the cover 2 is being opened, the locking is completely eliminated, so that the cover 2 can move into the open position without obstacle.

Figure 3:
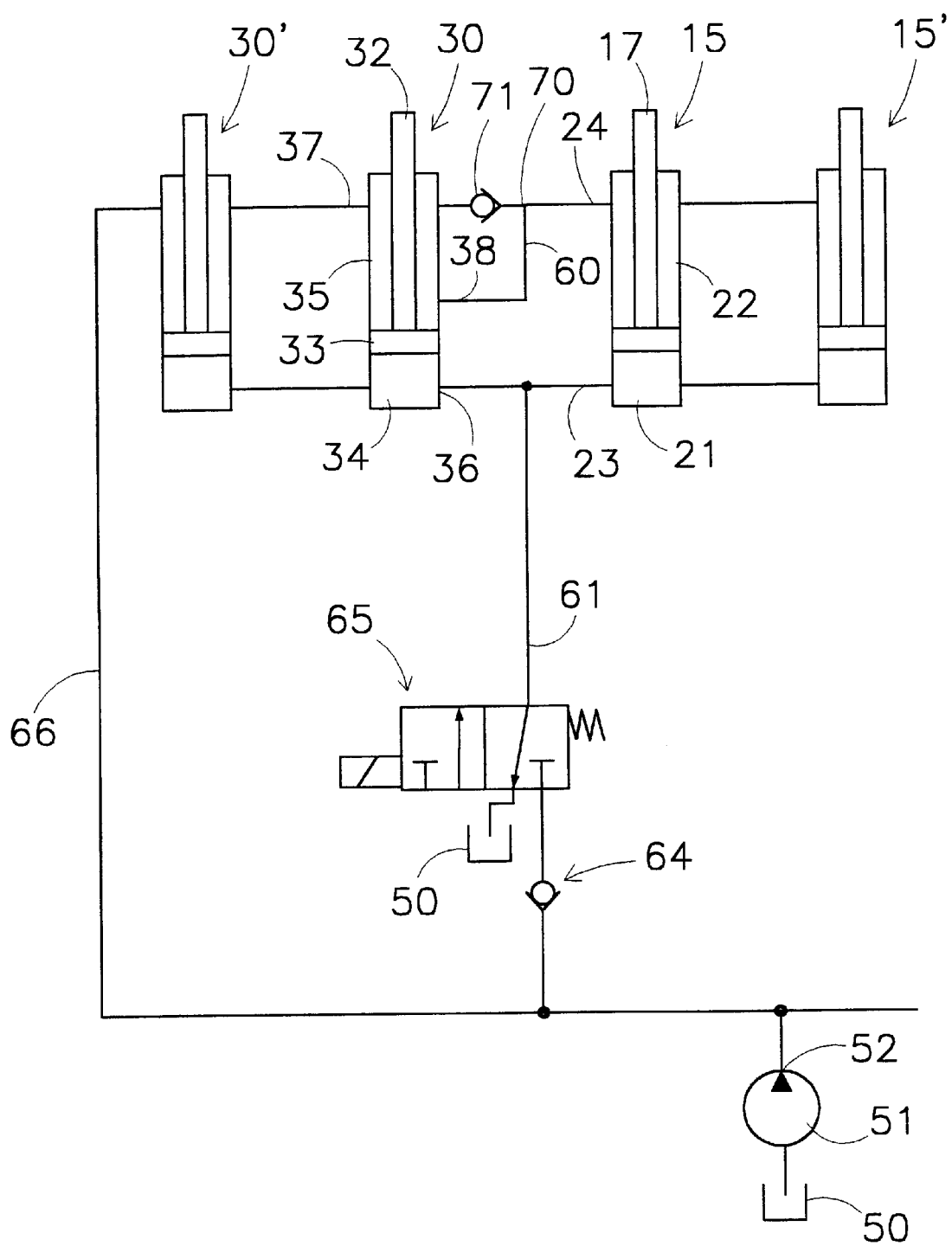
FIG. 3 shows the hydraulic circuit diagram of an alternative embodiment of the hydraulic actuating device according to the invention.

FIG. 3 shows a circuit diagram which forms an alternative to the circuit diagram shown in FIG. 2. In this figure, corresponding components are provided with the same reference numerals.

A difference from FIG. 2 is that a third connecting line 70 is provided, which at one end is connected to the first connecting line 60 and which is permanently in communication with the delivery port 52 of the pump, in this example via the line 66. A nonreturn valve 71, which closes in the direction of the second connection 24 of the lock actuator 15, is incorporated in the third connecting line 70.

This alternative has the advantage that the extending movement of the piston rods of the lock actuators 15, 15' and therefore the elimination of the locking of the cover 2 is not influenced by the movement of the piston 33 past the third opening 38a. In particular, the third opening 38a may be positioned close to the opening 36a, so that when the cover 2 is closing the lock elements are definitely in engagement before the lock actuators are activated. In this case, if appropriate, the above-described pin/slot coupling or the like to the lock actuator can be dispensed with.

What is claimed is:

1. A hydraulic actuating device for a cover and an associated lock for locking the cover in a the closed position, comprising:
    a hydraulic cover actuator for moving the cover between an open position and a closed position,
    a hydraulic lock actuator for moving the lock between a locked position and an unlocked position,
    the hydraulic cover actuator and the hydraulic lock actuator each comprising a housing in which there is an actuator space, which accommodates a piston and rod assembly which can slide to and fro and has a piston rod which projects out of the housing on one side, the piston delimiting a base-side chamber and a rod-side chamber in the actuator space, the housing being provided with a first and second connection for supplying and discharging hydraulic fluid, which connections are respectively in communication with an associated first and second opening which adjoin the actuator space and, in each position of the piston and rod assembly, are respectively in communication with the base-side chamber and the rod-side chamber,
    a reservoir for hydraulic fluid,
    a pump with a delivery port for providing pressurized hydraulic fluid,
    a single actuable hydraulic valve for controlling both the hydraulic cover actuator and the hydraulic lock actuator,
    wherein the hydraulic cover actuator is provided with a third opening which lies between the first opening and the second opening, and in that the third opening of the hydraulic cover actuator is connected, via a first connecting line, to the second connection of the hydraulic lock actuator, and
    the first connection of the hydraulic cover actuator and the first connection of the hydraulic lock actuator being connected to a common second connecting line, in which second connecting line the single actuable valve is accommodated, which in a first position connects the second connecting line to the reservoir and in a second position connects the delivery port of the pump to the second connecting line,
    and the second connection of the hydraulic cover actuator being in communication with the delivery port of the pump.

2. Actuating device according to claim 1, in which there is a nonreturn valve, which closes in the direction of the pump, between the delivery port of the pump and the actuable valve incorporated in the second connecting line.

3. Actuating device according to claim 1, in which a third connecting line is provided, which is connected to the first connecting line and is in permanent communication with the delivery port of the pump, a nonreturn valve, which closes in the direction of the second connection of the hydraulic lock actuator, being incorporated in the third connecting line.

4. Cover assembly comprising a moveable cover, an associated lock, and a hydraulic actuating device for said cover and associated lock for locking the cover in a closed position, said hydraulic actuating device comprising:
    a hydraulic cover actuator for moving the cover between an open position and a closed position,
    a hydraulic lock actuator for moving the lock between a locked position and an unlocked position,
    the hydraulic cover actuator and the hydraulic lock actuator each comprising a housing in which there is an actuator space, which accommodates a piston and rod assembly which can slide to and fro and has a piston rod which projects out of the housing on one side, the piston delimiting a base-side chamber and a rod-side chamber in the actuator space, the housing being provided with a first and second connection for supplying and discharging hydraulic fluid, which connections are respectively in communication with an associated first and second opening which adjoin the actuator space and, in each position of the piston and rod assembly, are respectively in communication with the base-side chamber and the rod-side chamber,
    a reservoir for hydraulic fluid,
    a pump with a delivery port for providing pressurized hydraulic fluid,
    a single actuable hydraulic valve for controlling both the hydraulic cover actuator and the hydraulic lock actuator,
    wherein the hydraulic cover actuator is provided with a third opening which lies between the first opening and the second opening, and in that the third opening of the hydraulic cover actuator is connected, via a first connecting line, to the second connection of the hydraulic lock actuator, and the first connection of the hydraulic cover actuator and the first connection of the hydraulic lock actuator being connected to a common second connecting line, in which second connecting line the single actuable valve is accommodated, which in a first position connects the second connecting line to the reservoir and in a second position connects the delivery port of the pump to the second connecting line, and the second connection of the hydraulic cover actuator being in communication with the delivery port of the pump.

5. Vehicle comprising a moveable cover, an associated lock for locking the cover in a closed position, and a hydraulic actuating device, said hydraulic actuating device comprising:

a hydraulic cover actuator for moving the cover between an open position and a closed position, a hydraulic lock actuator for moving the lock between a locked position and an unlocked position, the hydraulic cover actuator and the hydraulic lock actuator each comprising a housing in which there is an actuator space, which accommodates a piston and rod assembly which can slide to and fro and has a piston rod which projects out of the housing on one side, the piston delimiting a base-side chamber and a rod-side chamber in the actuator space, the housing being provided with a first and second connection for supplying and discharging hydraulic fluid, which connections are respectively in communication with an associated first and second opening which adjoin the actuator space and, in each position of the piston and rod assembly, are respectively in communication with the base-side chamber and the rod-side chamber, a reservoir for hydraulic fluid, a pump with a delivery port for providing pressurized hydraulic fluid, a single actuable hydraulic valve for controlling both the hydraulic cover actuator and the hydraulic lock actuator, wherein the hydraulic cover actuator is provided with a third opening which lies between the first opening and the second opening, and in that the third opening of the hydraulic cover actuator is connected, via a first connecting line, to the second connection of the hydraulic lock actuator, and the first connection of the hydraulic cover actuator and the first connection of the hydraulic lock actuator being connected to a common second connecting line, in which second connecting line the single actuable valve is accommodated, which in a first position connects the second connecting line to the reservoir and in a second position connects the delivery port of the pump to the second connecting line, and the second connection of the hydraulic cover actuator being in communication with the delivery port of the pump.

* * * * *

UNITED STATES PATENT AND TRADEMARK OFFICE
CERTIFICATE OF CORRECTION

PATENT NO. : 6,764,126 B2
DATED : July 20, 2004
INVENTOR(S) : Laurentius Andreas Gerhardus Mentink et al.

It is certified that error appears in the above-identified patent and that said Letters Patent is hereby corrected as shown below:

Column 5,
Line 47, change "in a the closed" should be -- in a closed --.

Signed and Sealed this

Twenty-ninth Day of March, 2005

JON W. DUDAS
*Director of the United States Patent and Trademark Office*